United States Patent
Le et al.

(10) Patent No.: US 6,230,182 B1
(45) Date of Patent: May 8, 2001

(54) COMPUTER LANGUAGE INTERPRETER WHICH CAN PERFORM TIME-CONSUMING OPERATIONS WITH MINIMAL IMPACT ON INTERACTIVE PROGRAMS

(75) Inventors: Bich-Cau Le, San Jose; Amit Patel, Cupertino, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/111,964

(22) Filed: Jul. 8, 1998

(51) Int. Cl.[7] ........................................... G06F 9/00
(52) U.S. Cl. ................... 709/102; 717/4; 717/5; 717/6; 717/3
(58) Field of Search .................... 709/100, 101, 709/102, 103, 104, 106, 107, 108; 717/3, 4, 5, 6, 9; 714/38, 35

(56) References Cited

U.S. PATENT DOCUMENTS 5,257,358 * 10/1993 Cohen ................................ 714/38
5,519,867 * 5/1996 Moeller et al. .................... 709/107
5,732,210 * 3/1998 Buzbee ............................... 714/38
5,909,578 * 1/1999 Buzbee ................................ 717/4
6,126,328 * 10/2000 Mallory et al. ..................... 717/4

* cited by examiner

Primary Examiner—Majid Banankhah

(57) ABSTRACT

A method of interpreting a program and performing time consuming operations at various times in a manner whereby the probability that a user of the program perceives any delay in the execution of the program is minimized. A time consuming operation as used herein is one which may take an interpreter from a fraction of a second to several seconds to perform, depending on the process. The method includes determining when a block will occur during the execution of the program. A block is a period of time that an operating system will halt a running of the program. Next it is determined whether or not to perform the time consuming operation based upon a criteria which depends on a length of time that the program is blocked. If it is blocked for a required time, the time consuming operation is performed, otherwise the interpreter will wait to perform the time consuming operation.

12 Claims, 4 Drawing Sheets

COMPUTER LANGUAGE INTERPRETER WHICH CAN PERFORM TIME-CONSUMING OPERATIONS WITH MINIMAL IMPACT ON INTERACTIVE PROGRAMS

BACKGROUND

The present invention relates generally to a computer language interpreter. More particularly, the present invention relates to an interpreter which performs time consuming operations without visibly impacting a user.

Software programs written in a source language and running on a hardware system are said to be interpreted if they are running under the control of a piece of software called an interpreter. An interpreter may execute the program's source language one instruction at a time by fetching, decoding, and reproducing the effects of each source instruction on the machine's state. A faster implementation may dynamically translate entire blocks of source language instructions into blocks of machine code which can be directly executed on the hardware. Such an interpreter is commonly called a dynamic translator.

Some interpreters collect behavioral information, called a profile, used to monitor and analyze the program's run-time behavior. Such profile data is important for translating source code into machine code because the translator can use the data to compile the program to run optimally for a specific hardware. Optimization leads to higher performance of the program. Some modern interpreters can profile the program as they execute it.

A problem can occur when the time comes to dynamically translate the instructions of the program or to process the profile data, both operations can be time consuming. The prior art tries to address the problem of performing time consuming operations in one of two ways. Each method of addressing the problem, however, can result in further problems.

For example, some interpreters immediately perform these time consuming operations as a need arises. In the case of profile data, the interpreter may want to send the data to a file, send the information over a network, or compress the data, all of which can be time consuming. A problem can occur if the program being interpreted is user interactive because the user may notice a pause in the execution of the program while the system performs the operation. For example, if the user is running a word processor and typing on a keyboard, he may notice a delay between the time that he pushes a key on the keyboard and when the character is displayed on the screen. Similarly, if the user is running an animation program on a monitor, a delay, even if very brief, could be easily noticed.

Further, some interpreters only perform time consuming operations when the program terminates. A problem can occur if the program never terminates, such as with a server program. The result is that the program may never be translated, and a run time of an interpreted program can be slow compared to the run time of a translated program. Similarly, while some other interactive programs ultimately terminate, they can execute for long periods of time before the program terminates. Hence, long periods of time will elapse before a compiler can translate the program, and utilize profile information to optimize the program.

Accordingly, in response to the problems discussed above, a primary object of the present invention is to provide an improved method for performing time consuming or heavyweight operations without the user noticing any slowdown in the program.

Another object of the present invention is to provide such an improved method wherein time consuming operations are performed before the program terminates.

A further object of the present invention is to provide such an improved method which is adapted to process profile information and to dynamically translate blocks of the program while the program is executing, without the user noticing any delay in the program execution.

These and other objects of the present invention will be apparent from the following detailed description of the invention, while referring to the attached drawings in which.

DETAILED DESCRIPTION OF THE PREFERRED EMBODIMENTS

Broadly stated, the present invention performs time consuming operations at specific times in the program's execution which are unlikely to cause any perceptible delay.

More specifically, the present invention is a method of interpreting a program and performing time consuming operations at various times during an execution of the program in a manner whereby the probability that a user of the program perceives any delay in the execution of the program is minimized. A time consuming operation as used herein is one which may take an interpreter from a fraction of a second to several seconds to perform, depending on the process. The method includes determining when a block will occur during the execution of the program. A block is a period of time that an operating system will halt a running of the program. Next it is determined whether or not to perform the time consuming operation based upon a criteria which depends on a length of time that the program will be blocked. Thereafter, the time consuming operation is performed if the criteria is met, otherwise the interpreter will wait to perform the operation. After the operation is performed, the execution of the program is resumed. While the criteria may include such considerations as changing the length of a block that must occur depending upon the type of program being run, or the type of instruction that will trigger the start of timing of a block, the main criteria is the whether a block being timed has a sufficient duration. If the block of the program is quite short, it is an indication that the program is active, i.e., a user is making rapid keystrokes or taking other actions that will result in display changes that the user expects to see. If the user does not see the activity on the display, he will perceive a delay. However, if there is a long block, it is assumed that the user is pausing for some reason, and the present invention uses that to advantage to perform the time consuming operation.

While the present invention refers to a UNIX® operating system, the present invention can be used with other operating systems such as WINDOWS NT®, WINDOWS 95®, and MACINTOSH®. The present invention uses UNIX® system calls for example purposes only. Each operating system includes system calls that correspond to UNIX® system calls and can be utilized by the present invention.

Figure 1:
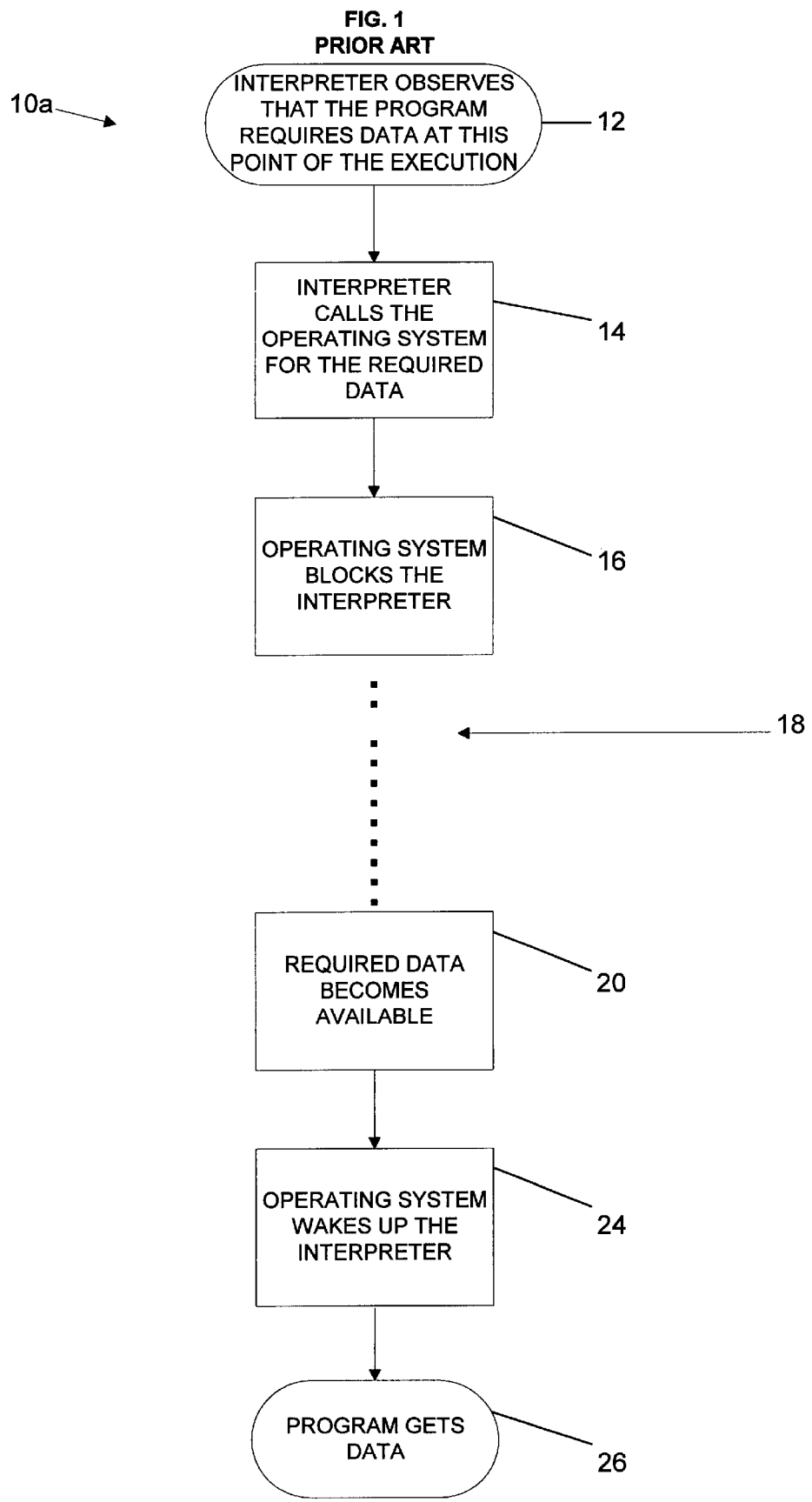
FIG. 1 is a prior art interpreter flow chart illustrating the steps that an interpreter takes to obtain input data for a program.
Figure 2:
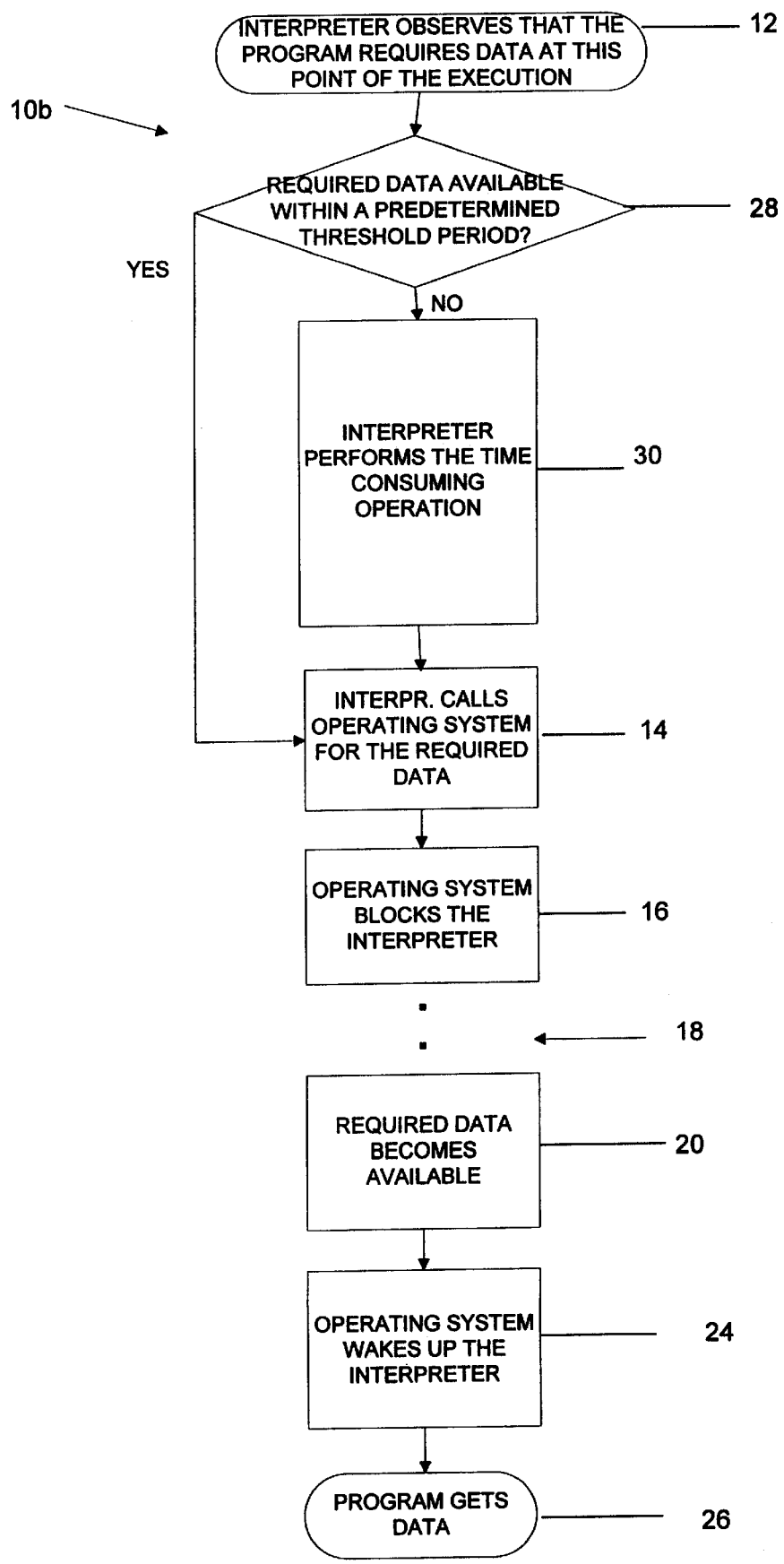
FIG. 2 is a flow chart of a first embodiment of the present invention showing how the present invention can intelligently handle an execution of a time consuming operation so that a user does not perceive a delay in the program.
Figure 3:
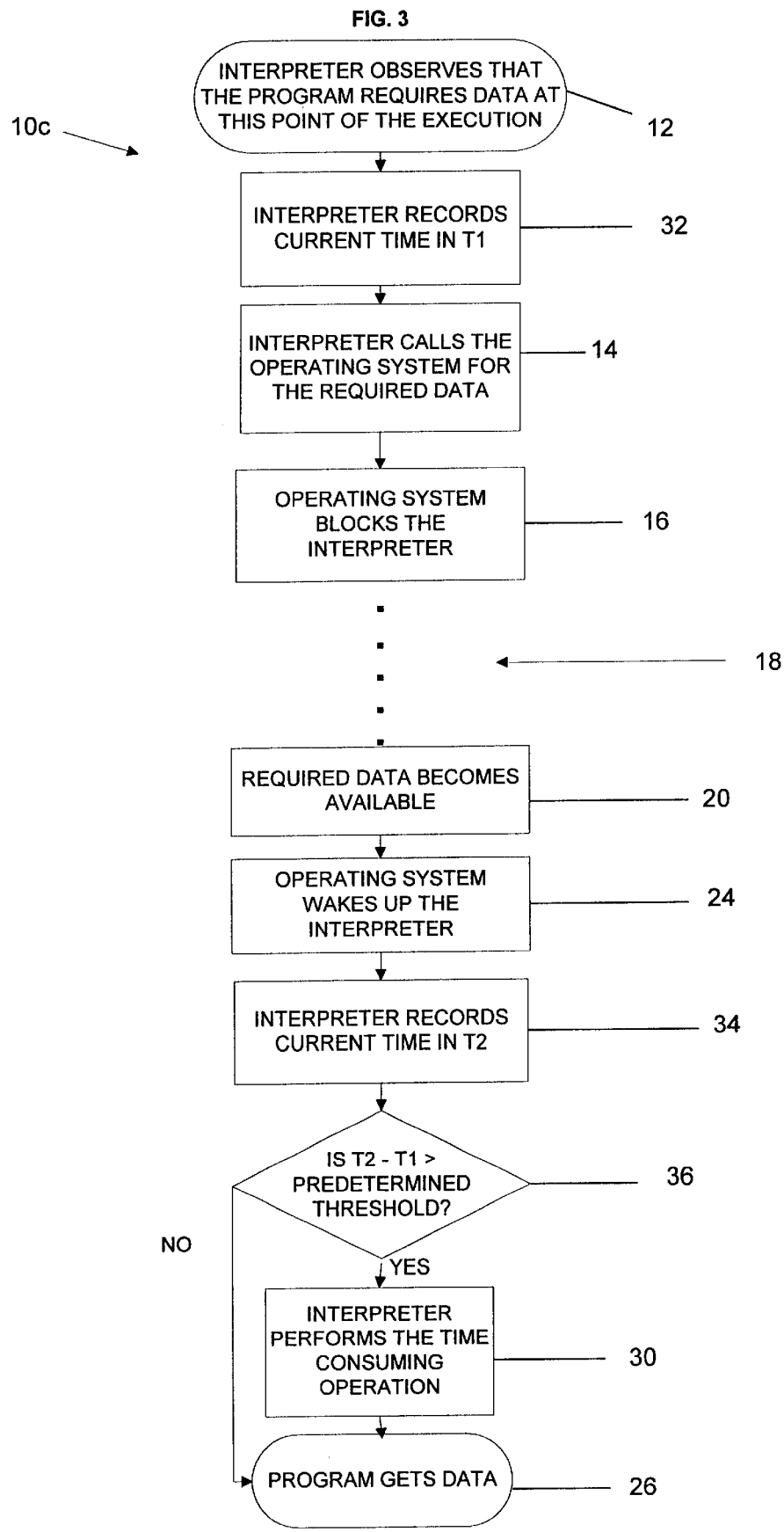
FIG. 3 is a flow chart of a second embodiment of the present invention showing another way of handling the execution of the time consuming operation so that a user does not perceive a delay in the program.
Figure 4:
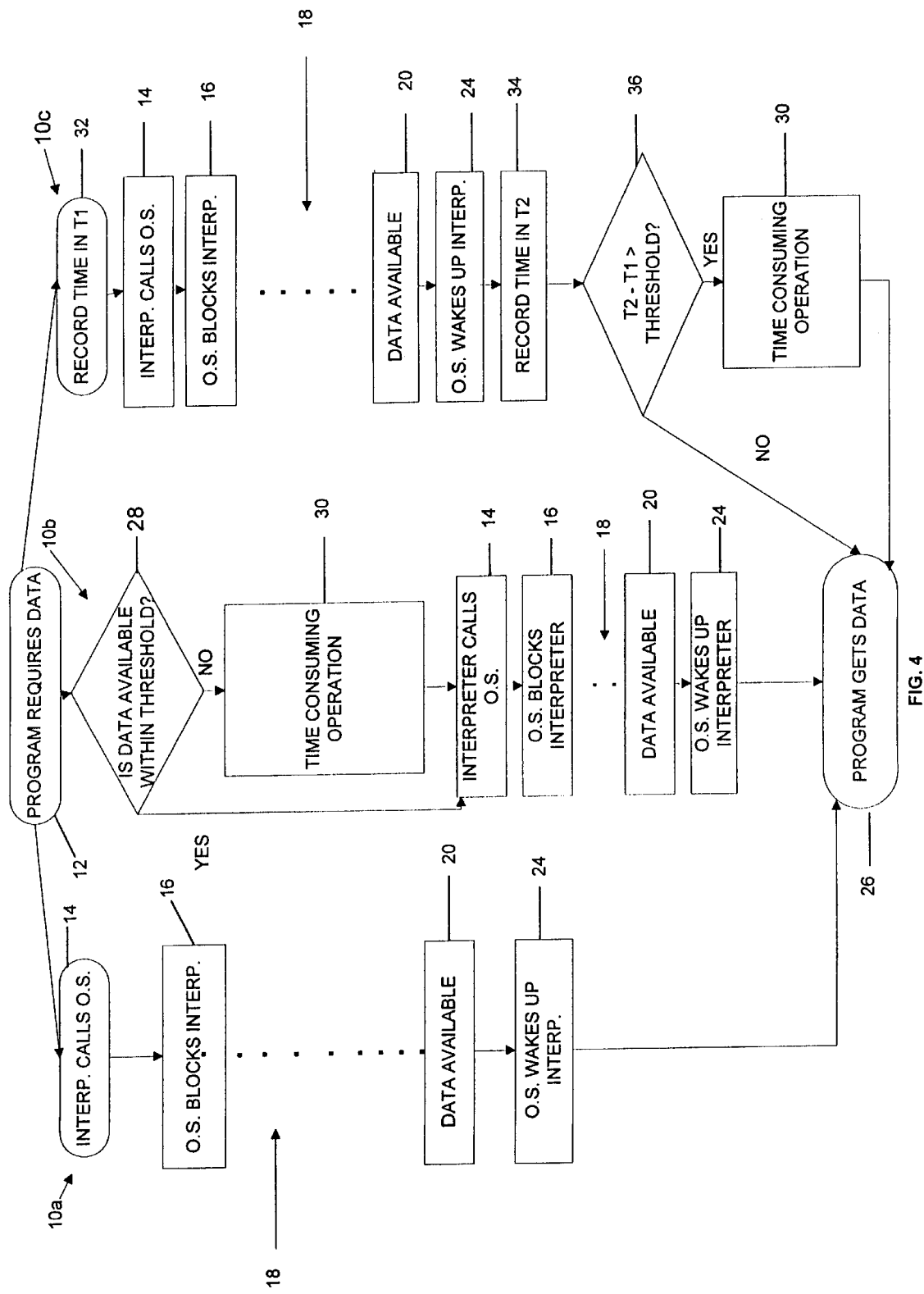
FIG. 4 shows the flow charts of FIGS. 1–3 aligned side-by-side to display the timing of each flow chart relative to the others.

Turning now to the drawings, flow charts of the prior art and the preferred embodiments of the present interpreter, designated generally as 10a–c, are shown isolated in FIGS. 1–3, and together side-by-side in FIG. 4. By showing the elements of FIGS. 1–3 side-by-side in FIG. 4, the relative time sequences of the prior art and each embodiment can be intuitively determined.

Now referring to the prior art illustration of FIG. 1, as the interpreter executes a program line-by-line, it may encounter an instruction which states that the program requires input data (block 12) at this point of the execution. For example, the program could require the user to strike a key on the keyboard before the interpreter can execute the next instruction. To read the input data, the interpreter typically makes a system call (block 14), i.e., a request to an operating system for the data. If no data is currently available, the operating system blocks the interpreter (block 16), thus suspending the program, for a period of time (block 18), until the input data becomes available (block 20). As the user strikes the key, the operating system detects that the data it was waiting for is now available (block 20). Subsequently, the operating system wakes up (block 24) the interpreter and the program gets the data (block 26). Thus, currently known interpreters do not utilize the fact that the program sits idle as the operating system waits for the data.

Referring now to FIG. 2, a first embodiment of the present invention can take advantage of the fact that an interactive program tends to wait for input from the user at certain times. Like the keyboard example above, interpreters also tend to wait for the user to click a button on a mouse device. Thus, mouse movements can be an ideal time for the interpreter to perform time consuming operations. Typically, from the program's perspective, the program is not interested in mouse movements. While every time the user moves the mouse by a small increment, a message may be sent to the program, in most cases the program throws the message out. The program is only interested in certain types of mouse movements such as when the user presses the button on the mouse. Similarly, many computers use a hardware mouse where the hardware itself is responsible for updating the cursor on your screen. Therefore, even if the program starts a long operation, the user will not notice the operation because the cursor will still move smoothly on the screen.

The present invention takes advantage of the fact that a lot of the time is spent in interactive programs waiting for the user to perform an act. With a word processor, for example, sometimes the user is exercising the program heavily, such as opening a file or typing very fast, but other times the program is idle. The invention tries to detect the idle times of the program and uses those times as an opportunity to perform time consuming operations. For example, there are times when the interpreter needs an input data before it can execute the next instruction. Normally, the interpreter will make a READ system call to the operating system to request the user's next input from the operating system. If the user's next input is not available, i.e., the user is not typing on the keyboard or clicking the mouse, then the operating system will block the program until the user generates the next input. The interpreter can determine whether the next data is or is not available, since a specific system call, such as SELECT for a UNIX® system, evidence the availability status of the data.

The first embodiment of the present interpreter utilizes a SELECT system call to determine if a required data is available. Using the SELECT system call, a program can specify a list of files to read from, e.g., the keyboard, the mouse, or a file for storing data, and wait until the data is available for one or more of the specified files. The SELECT system call invokes the operating system to block the program until the data is available. When data becomes available, the SELECT system call returns to the interpreter a value corresponding to the number of files that have data ready for the program to read, but does not read the data. Conversely, the SELECT system call can return a value of zero if no data becomes available within the passing of a predetermined time. An argument of the SELECT system call allows the interpreter to set the predetermined time that will elapse before the SELECT call returns with a zero. The argument can range from zero to infinity, typically in increments of a tenth of a second.

Therefore, in the present invention, instead of immediately performing a READ system call to the operating system for the next data input, the interpreter will make a SELECT system call to determine whether the data will be available within a predetermined time (block 28). The predetermined time can be utilized to avoid instances when the operating system will block the program for a small amount of time, typically less than one second. Thus, if the data becomes available before the predetermined time expires, then the SELECT system call will return with a number other than zero and the interpreter will perform a READ system call to the operating system (block 14) without performing the time consuming operation.

If the data is not available before the predetermined time lapses, however, the SELECT system call will return a value of zero. The interpreter then assumes that it can perform the time consuming operation (block 30) without being noticeable to the user since the operating system would need to block the program to wait for the data anyway. Thus, the interpreter will block the program and perform the time consuming operation. When the operation is complete, the interpreter can make a READ call to the operating system (block 14), and the operating system will continue to block (block 16) the interpreter until the input data becomes available. Hence, the interpreter is able to effectively utilize a portion of the time that the program was blocking to wait for the data. As the required data becomes available (block 20) the operating system detects the data and wakes up (block 24) the interpreter, and the program gets the data (block 26).

The following pseudo code is applicable for the first embodiment when the interpreter intercepts the READ system call produced by the program:

```
/* First, determine if the READ system call would have blocked */
/* the program for longer than the READ_THRESHOLD. */
if(SELECT (file_descriptor, READ_THRESHOLD) == 0)
{    /* The program was blocked for longer than the */
     /* threshold, therefore the program could be reading */
     /* a slow device. */
     do_heavy_work();
     /* Now make the READ system call so that the */
     /* program can get the data. The arguments are as */
     /* follow: file_descriptor is the file read from, including */
     /* the mouse and keyboard; buffer is the location */
     /* where the data is stored; and length is the number of */
     /* bytes to read (typically the size of buffer). */
     read (file_descriptor, buffer, length);
```

-continued

```
        }
        else
        {
            /* If the data is available before the threshold time */
            /* expires, then the interpreter will not perform */
            /* the time consuming operation at this time. */
            read (file_descriptor, buffer, length);
        }
```

Referring now to FIG. 3, another embodiment the present invention relies on the concept that, if the operating system blocks the program for a certain amount of time, the interpreter can continue to penalize the program for a fraction of the amount of time that the program is being blocked and remain tranparant to the user. Returning to the keystroke example, while the user may be typing quickly, the keystrokes may be buffered so that the word processing screen will not always keep up with the user but eventially the screen will catch up with the user.

In this embodiment, the interpreter records a first current time to an address for a memory location (block 32) after observing that the program requires the data (block 12) and before calling the operating system to take control and acquire the necessary data (block 14). The current time can be accessed from a central processing unit, for example. The interpreter then gives control to the operating system to get the required data (block 14). The operating system blocks the interpreter (block 16) until the required data becomes available (block 20). As the data becomes available (block 20), the operating system detects the data and then wakes up the interpreter (block 24). The interpreter records a second current time (block 34) after the operating system wakes the interpreter up (block 24) and before the operating system gives the data to the program (block 26).

The interpreter then calculates an elapsed time (block 36) as a difference between the second time (block 34) and the first time (block 32), and then determines whether the elapsed time exceeds a threshold time (block 36). In this embodiment, the threshold time can be determined as a percentage of the elapsed time due to the program block compared to the time needed to execute the time consuming operation. If the operating system blocked the program for 10 seconds, for example, then the interpreter may penalize the program for an additional 1 second without being perceptible to the user. If the elapsed time exceeds the value for the threshold time, then the interpreter first performs the time consuming operation (block 30) before giving the data acquired from the system call to the program (block 26). If the elapsed time does not exceed the value for the threshold, however, then the interpreter does not perform the time consuming operation and the program gets the input data (block 26).

The following pseudo code is applicable for the second embodiment when the interpreter intercepts the READ system call produced by the program:

```
struct timeval T1, T2;
gettimeofday (&T1);
/*Make the READ system call*/
read (file_descriptor, buffer, length);
gettimeofday (&T2);
If ((T2-T1)>READ_THRESHOLD)
{
    do_heavy_work( );
}
```

From the foregoing description, it should be appreciated that an improved interpreter has been shown and described which has many desirable attributes and advantages. The present invention can intelligently perform time consuming operations during the execution of interactive programs, without the time consuming operations being perceived by users.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of interpreting and executing a computer program that is running on a computer having a computer operating system of the type which can perform a block of the running of the program, the method being capable of performing a time consuming operation at various times in a manner whereby the probability that a user of the program perceives any delay in the execution of the program is minimized, said method comprising the steps of:

determining when the operating system will perform a block during the execution of the program;

determining whether to perform the time consuming operation, said determination being based upon predetermined criteria that is at least partially a function of the time duration of said block;

performing the time consuming operation when said predetermined criteria is met; and, resuming execution of the program.

2. The method as defined in claim 1 wherein said block determining step further comprises said application making a system call instruction to the operating system during execution of said program.

3. The method as defined in claim 2 wherein said system call instruction is to obtain input data for the program, said criteria being met when said input data is not supplied responsive to said system call instruction within a predetermined time duration, the time consuming operation being performed before said operating system blocks said program when said criteria is met, thereafter the system call instruction is allowed to proceed.

4. The method as defined in claim 3 wherein the operating system is a UNIX operating system and said system call instruction is a SELECT system call instruction.

5. The method as defined in claim 1 wherein said determination of whether to perform the time consuming operation further comprises:

recording a first time responsive to the interpreter observing that the program requires input data and before making a system call instruction to the operating system to take control and acquire the input data;

recording a second time after said operating system gets said input data responsive to said system call instruction and before said operating system sends said input data to the program;

calculating the difference between said second time and said first time;

determining whether said difference exceeds a threshold value;

performing the time consuming operation when said elapsed time exceeds said threshold value;

sending said input data to the program; and, resuming execution of the program.

6. The method as defined in claim 5 wherein said time consuming operation occurs after a determination that said difference exceeds said threshold value and before said program obtains said input data.

7. The method as defined in claim 5 wherein said threshold value is determined as a percentage of the time duration due to the program block compared to the time needed to execute the time consuming operation.

8. A method of interpreting and executing a computer program that is being run on a computer having a computer operating system of the type which can block the execution of the program, the computer program being of the type which generates system call instructions to the operating system for obtaining input data for use in the execution the program, the method being capable of selectively performing a time consuming operation without substantially noticeably delaying the execution of the program, said method comprising the steps of:

recording the time when the operating system blocks the execution of the program responsive to the program generating a system call instruction for obtaining input data for continuing the execution of the program;

measuring the elapsed time from the time of said generated system call instruction and performing the time consuming operation when the elapsed time exceeds a predetermined threshold value before said input data is obtained; and, resuming execution of the program.

9. The method as defined in claim 8 wherein said computer program is an interactive program wherein the user performs input operations during the normal course of operating the program.

10. The method as defined in claim 8 wherein said elapsed time is a predetermined value.

11. The method as defined in claim 8 wherein said elapsed time is determined as a percentage of the time duration due to the program being blocked compared to the time needed to execute the time consuming operation.

12. The method as defined in claim 8 wherein the operating system is a UNIX operating system and said system call instruction is a SELECT system call instruction.

\* \* \* \* \*